United States Patent
Tsai et al.

(10) Patent No.: US 10,101,561 B2
(45) Date of Patent: Oct. 16, 2018

(54) FIVE-PIECE OPTICAL IMAGING LENS

(71) Applicant: NEWMAX TECHNOLOGY CO., LTD., Tai-Chung (TW)

(72) Inventors: Fei-Hsin Tsai, Tai-Chung (TW); Shu-Tzu Lai, Tai-Chung (TW); Sian-Chih Ke, Tai-Chung (TW)

(73) Assignee: NEWMAX TECHNOLOGY CO., LTD. (TW)

( * ) Notice: Subject to any disclaimer, the term of this patent is extended or adjusted under 35 U.S.C. 154(b) by 51 days.

(21) Appl. No.: 15/298,761

(22) Filed: Oct. 20, 2016

(65) Prior Publication Data

US 2018/0113281 A1  Apr. 26, 2018

(51) Int. Cl.
*G02B 9/60* (2006.01)
*G02B 13/00* (2006.01)
*G02B 5/20* (2006.01)

(52) U.S. Cl.
CPC ......... *G02B 13/0045* (2013.01); *G02B 5/208* (2013.01); *G02B 9/60* (2013.01)

(58) Field of Classification Search
CPC ... G02B 9/60; G02B 9/62; G02B 6/64; G02B 13/0045
USPC ........ 359/708, 713, 714, 754–757, 763, 764
See application file for complete search history.

(56) References Cited

U.S. PATENT DOCUMENTS

| | | | |
|---|---|---|---|
| 7,564,635 B1 | 7/2009 | Tang | |
| 7,920,340 B2 | 4/2011 | Tang | |
| 8,605,368 B2 | 12/2013 | Tsai et al. | |
| 8,649,113 B1 | 2/2014 | Tsai et al. | |
| 2011/0013069 A1* | 1/2011 | Chen | G02B 9/60 348/335 |
| 2013/0258185 A1* | 10/2013 | Chang | G02B 13/0045 348/374 |
| 2015/0219880 A1* | 8/2015 | Chang | G02B 9/60 359/764 |
| 2015/0253537 A1* | 9/2015 | Ye | G02B 9/60 348/374 |

FOREIGN PATENT DOCUMENTS

| | | |
|---|---|---|
| TW | 201339632 A | 10/2013 |
| TW | 201403121 A | 1/2014 |

* cited by examiner

*Primary Examiner* — Darryl J Collins
(74) *Attorney, Agent, or Firm* — Bruce Stone LLP; Joseph Bruce

(57) ABSTRACT

A five-piece optical imaging lens, in order from an object side to an image side, includes: an aperture stop; a first lens element with a positive refractive power having an object-side surface being convex near an optical axis and the image-side surface being concave near the optical axis; a second lens element with a negative refractive power having an object-side surface being convex near the optical axis and an image-side surface being concave near the optical axis; a third lens element with a negative refractive power having an image-side surface being concave near the optical axis; a fourth lens element with a positive refractive power having an object-side surface being concave near the optical axis and an image-side surface being convex near the optical axis; a fifth lens element with a negative refractive power having an image-side surface being concave near the optical axis.

18 Claims, 6 Drawing Sheets

FIVE-PIECE OPTICAL IMAGING LENS

BACKGROUND

Field of the Invention

The present invention relates to an imaging lens, and more particularly to a miniaturized five-piece optical imaging lens applicable to electronic products.

Related Prior Art

Currently, small imaging lens with high image quality has become the standard equipment for mobile devices. In addition, as the advanced semiconductor manufacturing technologies have allowed the pixel size of image sensors to be reduced and compact, there's an increasing demand for imaging lens featuring finer resolution and better image quality.

A conventional imaging lens used in mobile devices, such as, mobile phone, tablet computer and other wearable electronic devices, usually consists of three to four lens elements: such as the imaging lenses described in U.S. Pat. Nos. 7,564,635 and 7,920,340, which cannot obtain better image quality. The imaging lenses consisting of five lens elements disclosed in U.S. Pat. Nos. 8,605,368, 8,649,113 and TW Appl. Nos. 102137030 and 102121155 have better image quality, however, the sensitivity problem during manufacturing and assembling processes is often existed while having a large aperture value, increasing the production cost. Or the peripheral image quality will be reduced while reducing the assembly tolerance, causing the peripheral imaging vague or deformed.

The present invention has arisen to mitigate and/or obviate the afore-described disadvantages.

SUMMARY

The present invention is aimed at providing a five-piece optical imaging lens having high image quality, high resolution, low distortion and low sensitivity to assembly.

According to one aspect of the present invention, a five-piece optical imaging lens, in order from an object side to an image side, comprises: an aperture stop; a first lens element with a positive refractive power having an object-side surface being convex near an optical axis and the image-side surface being concave near the optical axis, at least one of the object-side and image-side surfaces of the first lens element being aspheric; a second lens element with a negative refractive power having an object-side surface being convex near the optical axis and an image-side surface being concave near the optical axis, at least one of the object-side and image-side surfaces of the second lens element being aspheric; a third lens element with a negative refractive power having an image-side surface being concave near the optical axis, at least one of the object-side and image-side surfaces of the third lens element being aspheric; a fourth lens element with a positive refractive power having an object-side surface being concave near the optical axis and an image-side surface being convex near the optical axis, at least one of the object-side and image-side surfaces of the fourth lens element being aspheric; a fifth lens element with a negative refractive power having an image-side surface being concave near the optical axis, at least one of the object-side and image-side surfaces of the fifth lens element being aspheric, and at least one inflection point being formed on the object-side surface and the image-side surface of the fifth lens element.

Preferably, a focal length of the fourth lens element is f4, a focal length of the second and third lens elements combined is f23, and they satisfy the relation: $-2.7<f23/f4<-1.5$, which can increase the field of view and enlarge the aperture stop of the five-piece optical imaging lens effectively. Meanwhile, the assembling tolerance can be reduced to improve yield rate.

Preferably, a focal length of the first lens element is f1, a focal length of the second lens element is f2, and they satisfy the relation: $-0.7<f1/f2<-0.3$, so that the refractive power of the first lens element and the second lens element are more suitable, it will be favorable to obtain a wide field of view and avoid the excessive increase of aberration of the system.

Preferably, a focal length of the fourth lens element is f4, a focal length of the second lens element is f2, and they satisfy the relation: $-3.1<f2/f4<-1.8$, which can increase the field of view and enlarge the aperture stop of the five-piece optical imaging lens effectively. Meanwhile, the assembling tolerance can be reduced to improve yield rate.

Preferably, a focal length of the fourth lens element is f4, a focal length of the fifth lens element is f5, and they satisfy the relation: $-1.5<f4/f5<-0.9$, which will be favorable to reduce the back focal length of the five-piece optical imaging lens so as to maintain the objective of miniaturization of the five-piece optical imaging lens.

Preferably, a focal length of the first lens element is f1, a focal length of the third lens element is f3, and they satisfy the relation: $-0.15<f1/f3<-0.05$, which can balance the refractive power of the five-piece optical imaging lens, consequently achieving the optimum imaging effect.

Preferably, a focal length of the second lens element is f2, the focal length of the fifth lens element is f5, and they satisfy the relation: $2.3<f2/f5<3.7$, which can effectively reduce the total length of the five-piece optical imaging lens, and consequently achieving the purpose of miniaturization.

Preferably, a focal length of the first lens element is f1, the focal length of the fourth lens element is f4, and they satisfy the relation: $0.7<f1/f4<1.6$, which can balance the refractive power of the five-piece optical imaging lens, consequently achieving the optimum imaging effect.

Preferably, a focal length of the first lens element is f1, a focal length of the second and third lens elements combined is f23, and they satisfy the relation: $-0.75<f1/f23<-0.35$, which can balance the refractive power of the five-piece optical imaging lens, consequently achieving the optimum imaging effect.

Preferably, a focal length of the second and third lens elements combined is f23, a focal length of the fourth and fifth lens elements combined is f45, and they satisfy the relation: $-0.1<f23/f45<-0.005$. When $-0.1<f23/f45<-0.005$ is satisfied, a wide field of view, big stop, high pixel and low height can be provided and the resolution can be improved evidently. Contrarily, if f23/f45 exceeds the above range, the performance and resolution of the five-piece optical imaging lens will be reduced, and the yield rate will be low.

Preferably, a focal length of the first and second lens elements combined is f12, a focal length of the third and fourth lens elements combined is f34, and they satisfy the relation: $1.0<f12/f34<2.4$. When $1.0<f12/f34<2.4$ is satisfied, a wide field of view, big stop, high pixel and low height can be provided and the resolution can be improved evidently. Contrarily, if f12/f34 exceeds the above range, the performance and resolution of the five-piece optical imaging lens will be reduced, and the yield rate will be low.

Preferably, a focal length of the third and fourth lens elements combined is f34, a focal length of the fifth lens element is f5, and they satisfy the relation: −1.6<f34/f5<−0.9. When −1.6<f34/f5<−0.9 is satisfied, a wide field of view, big stop, high pixel and low height can be provided and the resolution can be improved evidently. Contrarily, if f34/f5 exceeds the above range, the performance and resolution of the five-piece optical imaging lens will be reduced, and the yield rate will be low.

Preferably, a focal length of the first lens element is f1, a focal length of the second, third and fourth lens elements combined is f234, and they satisfy the relation: 0.5<f1/f234<1.5. Appropriate refractive power is favorable to reduce the spherical aberration and astigmatism of the five-piece optical imaging lens effectively.

Preferably, a focal length of the fifth lens element is f5, a focal length of the second, third and fourth lens elements combined is f234, and they satisfy the relation: −2.0<f234/f5<−1.1. Appropriate refractive power is favorable to reduce the spherical aberration and astigmatism of the five-piece optical imaging lens effectively.

Preferably, a focal length of the fourth lens element is f4, a focal length of the first, second, and third lens elements combined is f123, and they satisfy the relation: 1.3<f123/f4<2.6. Appropriate refractive power is favorable to reduce the spherical aberration and astigmatism of the five-piece optical imaging lens effectively.

Preferably, a focal length of the first, second, and third lens elements combined is f123, a focal length of the fourth and fifth lens elements combined is f45, and they satisfy the relation: 0.005<f123/f45<0.1. Appropriate refractive power is favorable to reduce the spherical aberration and astigmatism of the five-piece optical imaging lens effectively.

Preferably, an Abbe number of the first lens element is V1, an Abbe number of the second lens element is V2, and they satisfy the relation: 30<V1−V2<42, which can reduce the chromatic aberration of the five-piece optical imaging lens effectively.

Preferably, an Abbe number of the third lens element is V3, an Abbe number of the fourth lens element is V4, and they satisfy the relation: 30<V4−V3<42, which can reduce the chromatic aberration of the five-piece optical imaging lens effectively.

Preferably, a focal length of the five-piece optical imaging lens is f, a distance from the object-side surface of the first lens element to the image plane along the optical axis is TL, and they satisfy the relation: 0.6<f/TL<0.95, it will be favorable to obtain a wide field of view and maintain the objective of miniaturization of the five-piece optical imaging lens, which can be used in thin electronic products.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1A:
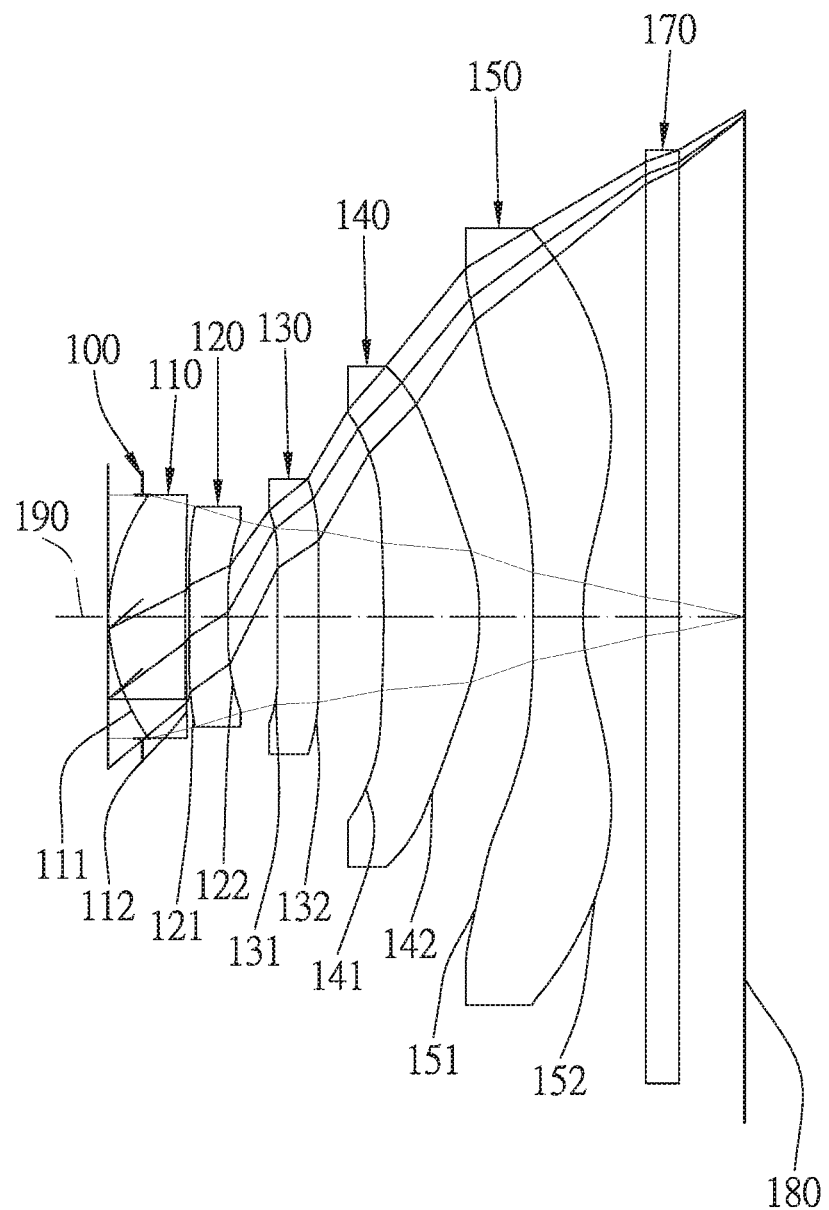
FIG. 1A shows a five-piece optical imaging lens in accordance with a first embodiment of the present invention.
Figure 1B:
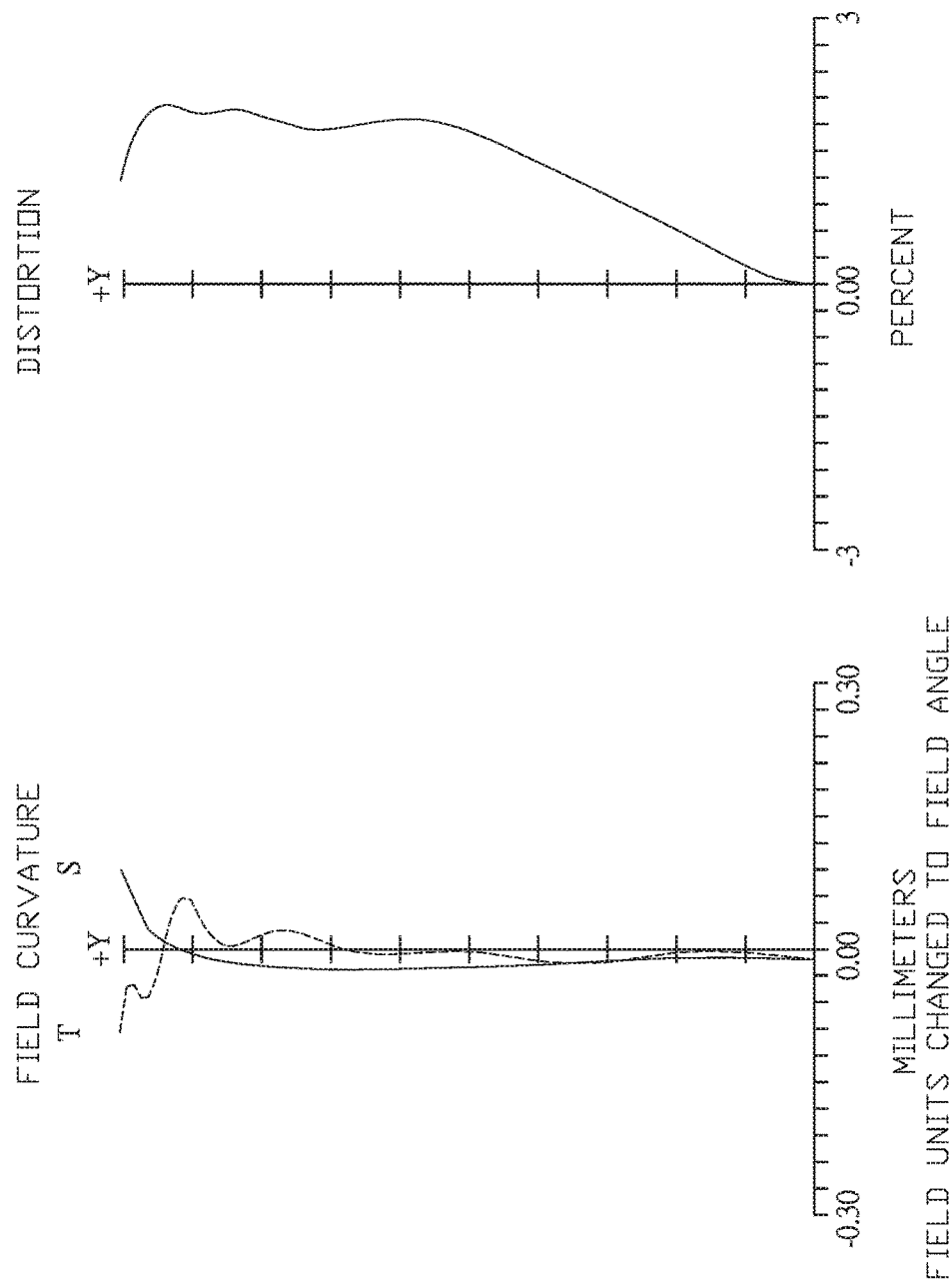
FIG. 1B shows the longitudinal spherical aberration curve, the astigmatic field curve and the distortion curve of the first embodiment of the present invention.

FIG. 1A shows a five-piece optical imaging lens in accordance with a first embodiment of the present invention, and FIG. 1B shows, in order from left to right, the longitudinal spherical aberration curves, the astigmatic field curves, and the distortion curve of the first embodiment of the present invention. The five-piece optical imaging lens in accordance with the first embodiment of the present invention comprises an aperture stop 100 and an optical assembly. The optical assembly comprises, in order from an object side to an image side: a first lens element 110, a second lens element 120, a third lens element 130, a fourth lens element 140, a fifth lens element 150, an IR cut filter 170 and an image plane 180, wherein the optical imaging lens has a total of five lens elements with refractive power. The aperture stop 100 is located between an image-side surface 112 of the first lens element 110 and an object to be photographed.

The first lens element 110 with a positive refractive power has an object-side surface 111 being convex near an optical axis 190 and the image-side surface 112 being concave near the optical axis 190, both the object-side and image-side surfaces 111, 112 are aspheric, and the first lens element 110 is made of plastic material.

The second lens element 120 with a negative refractive power has an object-side surface 121 being convex near the optical axis 190 and an image-side surface 122 being concave near the optical axis 190, both the object-side and image-side surfaces 121, 122 are aspheric, and the second lens element 120 is made of plastic material.

The third lens element 130 with a negative refractive power has an object-side surface 131 being convex near the optical axis 190 and an image-side surface 132 being concave near the optical axis 190, both the object-side and image-side surfaces 131, 132 are aspheric, the third lens element 130 is made of plastic material.

The fourth lens element 140 with a positive refractive power has an object-side surface 141 being concave near the optical axis 190 and an image-side surface 142 being convex near the optical axis 190, both the object-side and image-side surfaces 141, 142 are aspheric, the fourth lens element 140 is made of plastic material.

The fifth lens element 150 with a negative refractive power has an object-side surface 151 being concave near the optical axis 190 and an image-side surface 152 being convex near the optical axis 190, both the object-side and image-side surfaces 151, 152 are aspheric, the fifth lens element 150 is made of plastic material, and at least one inflection point is formed on the object-side surface 151 and the image-side surface 152 of the fifth lens element 150.

The IR cut filter 170 made of glass is located between the fifth lens element 150 and the image plane 180 and has no influence on the focal length of the optical imaging lens.

The equation for the aspheric surface profiles of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

z represents the distance of a point on the aspheric surface at a height h from the optical axis 190 relative to a plane perpendicular to the optical axis at the vertex of the aspheric surface;

c is a paraxial curvature equal to 1/R (R: a paraxial radius of curvature);

h represents a vertical distance from the point on the curve of the aspheric surface to the optical axis 190;

k represents the conic constant;

A, B, C, D, E, G . . . : represent the high-order aspheric coefficients.

In the first embodiment of the present five-piece optical imaging lens, the focal length of the optical imaging lens is f, the f-number of the optical imaging lens is Fno, the maximal field of view of the optical imaging lens is FOV, and the following conditions are satisfied: f=3.38 mm; Fno=2.2; and FOV=84 degrees.

In the first embodiment of the present five-piece optical imaging lens, a focal length of the first lens element 110 is f1, a focal length of the second lens element 120 is f2, and they satisfy the relation: f1/f2=−0.45.

In the first embodiment of the present five-piece optical imaging lens, a focal length of the fourth lens element 140 is f4, the focal length of the second lens element 120 is f2, and they satisfy the relation: f2/f4=−2.30.

In the first embodiment of the present five-piece optical imaging lens, the focal length of the fourth lens element 140 is f4, a focal length of the fifth lens element 150 is f5, and they satisfy the relation: f4/f5=−1.19.

In the first embodiment of the present five-piece optical imaging lens, the focal length of the first lens element 110 is f1, a focal length of the third lens element 130 is f3, and they satisfy the relation: f1/f3=−0.10.

In the first embodiment of the present five-piece optical imaging lens, the focal length of the second lens element 120 is f2, the focal length of the fifth lens element 150 is f5, and they satisfy the relation: f2/f5=2.73.

In the first embodiment of the present five-piece optical imaging lens, the focal length of the first lens element 110 is f1, the focal length of the fourth lens element 140 is f4, and they satisfy the relation: f1/f4=1.03.

In the first embodiment of the present five-piece optical imaging lens, the focal length of the first lens element 110 is f1, a focal length of the second and third lens elements 120, 130 combined is f23, and they satisfy the relation: f1/f23=−0.56.

In the first embodiment of the present five-piece optical imaging lens, the focal length of the fourth lens element 140 is f4, the focal length of the second and third lens elements 120, 130 combined is f23, and they satisfy the relation: f23/f4=−1.84.

In the first embodiment of the present five-piece optical imaging lens, the focal length of the second and third lens elements 120, 130 combined is f23, a focal length of the fourth and fifth lens elements 140, 150 combined is f45, and they satisfy the relation: f23/f45=−0.06.

In the first embodiment of the present five-piece optical imaging lens, a focal length of the first and second lens elements 110, 120 combined is f12, a focal length of the third and fourth lens elements 130, 140 combined is f34, and they satisfy the relation: f12/f34=1.47.

In the first embodiment of the present five-piece optical imaging lens, the focal length of the third and fourth lens elements 130, 140 combined is f34, the focal length of the fifth lens element 150 is f5, and they satisfy the relation: f34/f5=−1.27.

In the first embodiment of the present five-piece optical imaging lens, the focal length of the first lens element 110 is f1, a focal length of the second, third and fourth lens elements 120, 130, 140 combined is f234, and they satisfy the relation: f1/f234=0.74.

In the first embodiment of the present five-piece optical imaging lens, the focal length of the fifth lens element 150 is f5, a focal length of the second, third and fourth lens elements 120, 130, 140 combined is f234, and they satisfy the relation: f234/f5=−1.64.

In the first embodiment of the present five-piece optical imaging lens, the focal length of the fourth lens element 140 is f4, a focal length of the first, second, and third lens elements 110, 120, 130 combined is f123, and they satisfy the relation: f123/f4=1.76.

In the first embodiment of the present five-piece optical imaging lens, the focal length of the first, second, and third lens elements 110, 120, 130 combined is f123, the focal length of the fourth and fifth lens elements 140, 150 combined is f45, and they satisfy the relation: f123/f45=0.06.

In the first embodiment of the present five-piece optical imaging lens, an Abbe number of the first lens element 110 is V1, an Abbe number of the second lens element 120 is V2, and they satisfy the relation: V1-V2=34.5.

In the first embodiment of the present five-piece optical imaging lens, an Abbe number of the third lens element 130 is V3, an Abbe number of the fourth lens element 140 is V4, and they satisfy the relation: V4-V3=34.5.

In the first embodiment of the present five-piece optical imaging lens, the focal length of the five-piece optical imaging lens is f, a distance from the object-side surface 111 of the first lens element 110 to the image plane 180 along the optical axis 190 is TL, and they satisfy the relation: f/TL=0.86.

The detailed optical data of the first embodiment is shown in table 1, and the aspheric surface data is shown in table 2.

TABLE 1

Embodiment 1
f(focal length) = 3.38 mm, Fno = 2.2, FOV = 84 deg.

| Surface | | Curvature Radius | | Thickness | Material | index | Abbe # | Focal length |
|---|---|---|---|---|---|---|---|---|
| 0 | object | Infinity | | Infinity | | | | |
| 1 | | Infinity | | 0.210 | | | | |
| 2 | stop | Infinity | | −0.210 | | | | |
| 3 | lens 1 | 1.186 | (ASP) | 0.472 | plastic | 1.544 | 56.000 | 2.459 |

TABLE 1-continued

Embodiment 1
f(focal length) = 3.38 mm, Fno = 2.2, FOV = 84 deg.

| Surface | | Curvature Radius | | Thickness | Material | index | Abbe # | Focal length |
|---|---|---|---|---|---|---|---|---|
| 4 | | 8.675 | (ASP) | 0.030 | | | | |
| 5 | lens 2 | 28.471 | (ASP) | 0.235 | plastic | 1.650 | 21.400 | −5.511 |
| 6 | | 3.203 | (ASP) | 0.308 | | | | |
| 7 | lens 3 | 94.217 | (ASP) | 0.253 | plastic | 1.650 | 21.400 | −23.987 |
| 8 | | 13.490 | (ASP) | 0.395 | | | | |
| 9 | lens 4 | −7.631 | (ASP) | 0.592 | plastic | 1.544 | 56.000 | 2.398 |
| 10 | | −1.149 | (ASP) | 0.330 | | | | |
| 11 | lens 5 | −21.004 | (ASP) | 0.300 | plastic | 1.544 | 56.000 | −2.016 |
| 12 | | 1.168 | (ASP) | 0.387 | | | | |
| 13 | IR-filter | Infinity | | 0.210 | glass | 1.517 | 64.167 | — |
| 14 | | Infinity | | 0.400 | | | | |
| 15 | image plane | Infinity | | Infinity | | | | |

TABLE 2

Aspheric Coefficients

| surface | 3 | 4 | 5 | 6 | 7 |
|---|---|---|---|---|---|
| K: | −7.9299E+00 | 1.1390E+02 | −6.5622E+01 | 1.0532E+01 | −1.0896E+02 |
| A: | 5.6250E−01 | −1.8825E−01 | −9.3250E−02 | 1.8756E−02 | −3.0017E−01 |
| B: | −9.2991E−01 | −3.4601E−01 | 1.9641E−01 | 5.4618E−01 | −2.4961E−01 |
| C: | 1.4921E+00 | 6.1631E+00 | 4.0450E+00 | −1.2890E+00 | 1.6143E+00 |
| D: | −1.6421E+00 | −2.0997E+01 | −1.4988E+01 | 3.9565E+00 | −4.8376E+00 |
| E: | 9.5937E−01 | 2.8648E+01 | 2.0498E+01 | −6.9669E+00 | 8.1772E+00 |
| F: | −5.3793E−01 | −1.4661E+01 | −9.7457E+00 | 5.5850E+00 | −5.5458E+00 |

| surface | 8 | 9 | 10 | 11 | 12 |
|---|---|---|---|---|---|
| K: | −1.5343E+02 | 1.1451E+01 | −6.4057E+00 | −9.5351E+01 | −6.4916E+00 |
| A: | −2.0768E−01 | 1.0672E−01 | −4.8120E−02 | −1.1037E−01 | −1.4379E−01 |
| B: | −2.0149E−01 | −1.4174E−01 | 2.3596E−01 | −1.9670E−02 | 7.4429E−02 |
| C: | 7.6873E−01 | −6.0300E−03 | −3.5003E−01 | 5.6647E−02 | −2.9160E−02 |
| D: | −1.4405E+00 | 2.4152E−02 | 2.3950E−01 | −2.3220E−02 | 7.2020E−03 |
| E: | 1.7082E+00 | 5.9280E−03 | −7.9460E−02 | 3.8620E−03 | −9.6000E−04 |
| F: | −7.7109E−01 | −4.0500E−03 | 1.0127E−02 | −2.3000E−04 | 5.1000E−05 |

The units of the radius of curvature, the thickness and the focal length in table 1 are expressed in mm, the surface numbers 0-15 represent the surfaces sequentially arranged from the object-side to the image-side along the optical axis. In table 2, k represents the conic coefficient of the equation of the aspheric surface profiles, and A, B, C, D, E, F, . . . : represent the high-order aspheric coefficients. The tables presented below for each embodiment are the corresponding schematic parameter and aberration curves, and the definitions of the tables are the same as Table 1 and Table 2 of the first embodiment. Therefore, an explanation in this regard will not be provided again.

Figure 2A:
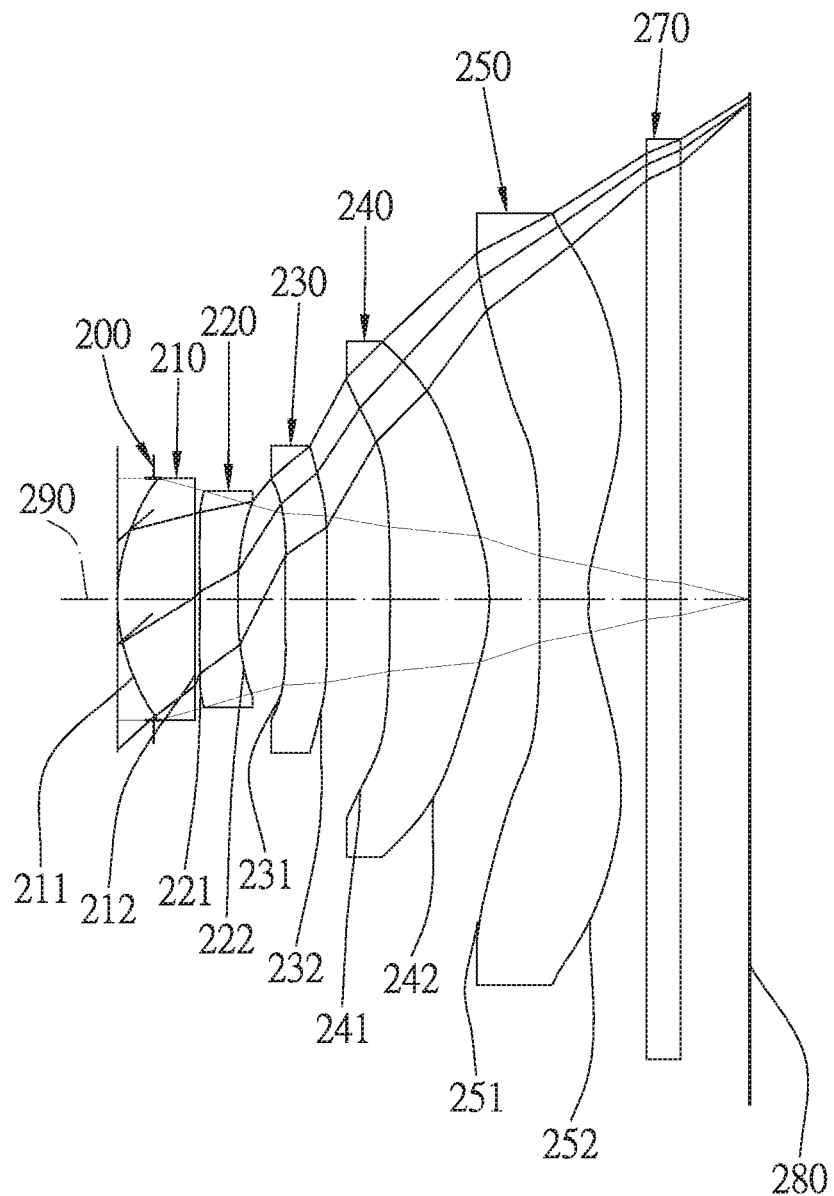
FIG. 2A shows a five-piece optical imaging lens in accordance with a second embodiment of the present invention.
Figure 2B:
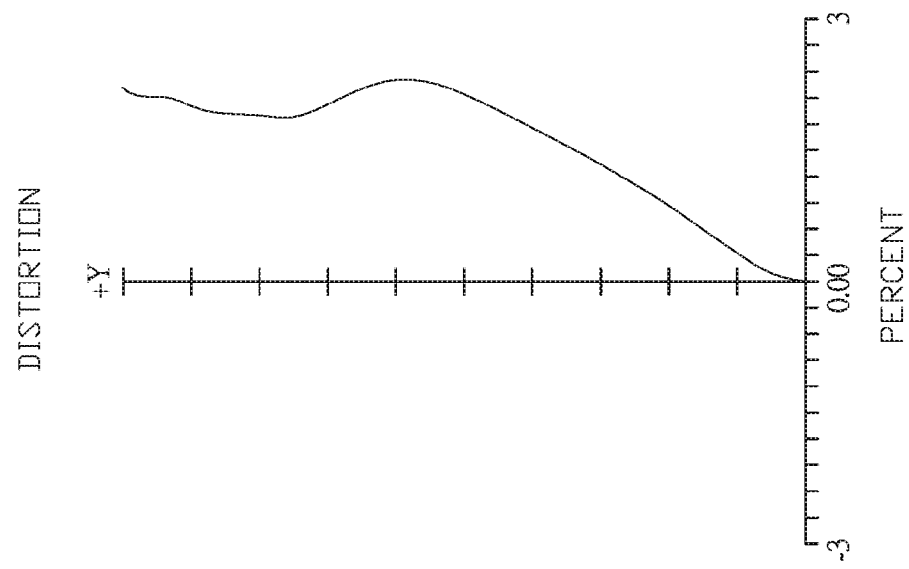
FIG. 2B shows the longitudinal spherical aberration curve, the astigmatic field curve and the distortion curve of the second embodiment of the present invention.
Figure 2B:
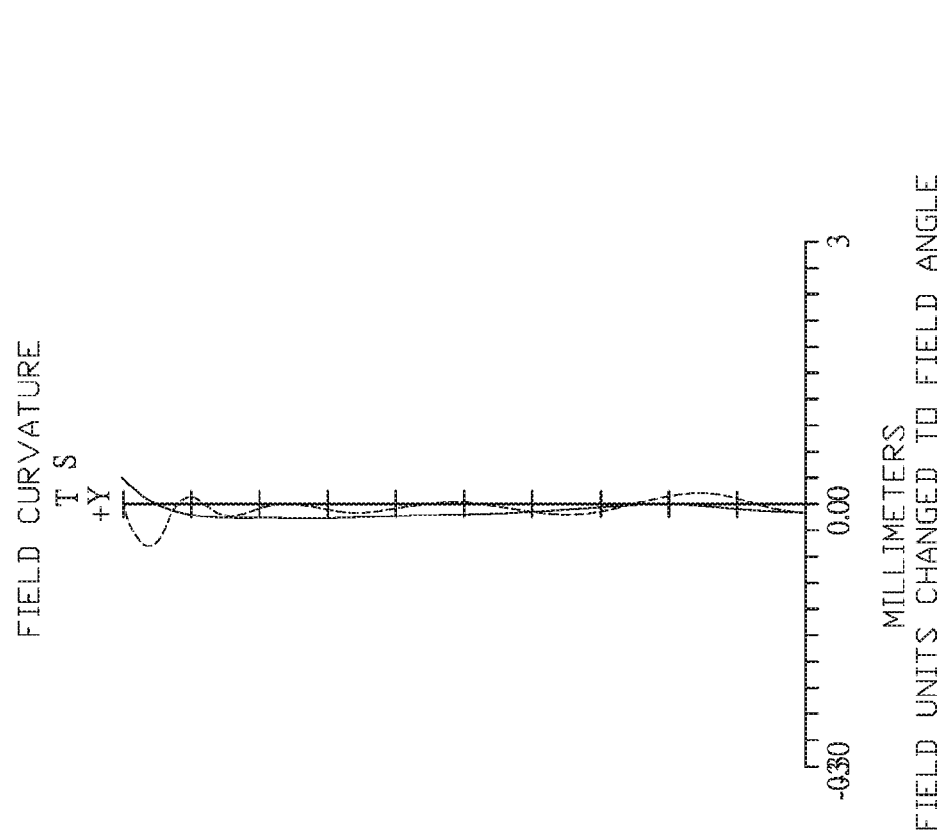

FIG. 2A shows a five-piece optical imaging lens in accordance with a second embodiment of the present invention, and FIG. 2B shows, in order from left to right, the longitudinal spherical aberration curves, the astigmatic field curves, and the distortion curve of the second embodiment of the present invention. The five-piece optical imaging lens in accordance with the second embodiment of the present invention comprises an aperture stop 200 and an optical assembly. The optical assembly comprises, in order from an object side to an image side: a first lens element 210, a second lens element 220, a third lens element 230, a fourth lens element 240, a fifth lens element 250, an IR cut filter 270 and an image plane 280, wherein the five-piece optical imaging lens has a total of five lens elements with refractive power. The aperture stop 200 is located between an image-side surface 212 of the first lens element 210 and an object to be photographed.

The first lens element 210 with a positive refractive power has an object-side surface 211 being convex near an optical axis 290 and the image-side surface 212 being concave near the optical axis 290, both the object-side and image-side surfaces 211, 212 are aspheric, and the first lens element 210 is made of plastic material.

The second lens element 220 with a negative refractive power has an object-side surface 221 being convex near the optical axis 290 and an image-side surface 222 being concave near the optical axis 290, both the object-side and image-side surfaces 221, 222 are aspheric, and the second lens element 220 is made of plastic material.

The third lens element 230 with a negative refractive power has an object-side surface 231 being concave near the optical axis 290 and an image-side surface 232 being concave near the optical axis 290, both the object-side and image-side surfaces 231, 232 are aspheric, the third lens element 230 is made of plastic material.

The fourth lens element 240 with a positive refractive power has an object-side surface 241 being concave near the optical axis 290 and an image-side surface 242 being convex near the optical axis 290, both the object-side and image-side surfaces 241, 242 are aspheric, the fourth lens element 240 is made of plastic material.

The fifth lens element 250 with a negative refractive power has an object-side surface 251 being convex near the optical axis 290 and an image-side surface 252 being concave near the optical axis 290, both the object-side and image-side surfaces 251, 252 are aspheric, the fifth lens element 250 is made of plastic material, and at least one inflection point is formed on one of the object-side surface 251 and the image-side surface 252 of the fifth lens element 250.

The IR cut filter 270 made of glass is located between the fifth lens element 250 and the image plane 280 and has no influence on the focal length of the optical imaging lens.

The detailed optical data of the second embodiment is shown in table 3, and the aspheric surface data is shown in table 4.

TABLE 3

Embodiment 2
f(focal length) = 3.38 mm, Fno = 2.2, FOV = 83 deg.

| Surface | | Curvature Radius | | Thickness | Material | index | Abbe # | Focal length |
|---|---|---|---|---|---|---|---|---|
| 0 | object | Infinity | | Infinity | | | | |
| 1 | | Infinity | | 0.217 | | | | |
| 2 | stop | Infinity | | −0.217 | | | | |
| 3 | lens 1 | 1.178 | (ASP) | 0.479 | plastic | 1.544 | 56.000 | 2.438 |
| 4 | | 8.738 | (ASP) | 0.030 | | | | |
| 5 | lens 2 | 32.180 | (ASP) | 0.235 | plastic | 1.650 | 21.400 | −5.393 |
| 6 | | 3.184 | (ASP) | 0.302 | | | | |
| 7 | lens 3 | −349.718 | (ASP) | 0.249 | plastic | 1.650 | 21.400 | −30.868 |
| 8 | | 21.541 | (ASP) | 0.398 | | | | |
| 9 | lens 4 | −6.868 | (ASP) | 0.612 | plastic | 1.544 | 56.000 | 2.523 |
| 10 | | −1.184 | (ASP) | 0.314 | | | | |
| 11 | lens 5 | 24.842 | (ASP) | 0.300 | plastic | 1.544 | 56.000 | −2.096 |
| 12 | | 1.090 | (ASP) | 0.363 | | | | |
| 13 | IR-filter | Infinity | | 0.210 | glass | 1.517 | 64.167 | — |
| 14 | | Infinity | | 0.425 | | | | |
| 15 | image plane | Infinity | | Infinity | | | | |

TABLE 4

Aspheric Coefficients

| surface | 3 | 4 | 5 | 6 | 7 |
|---|---|---|---|---|---|
| K: | −7.6371E+00 | 1.1914E+02 | −1.9960E+02 | 1.1417E+01 | −2.0000E+02 |
| A: | 5.5787E−01 | −2.0178E−01 | −8.8950E−02 | 2.7029E−02 | −2.9195E−01 |
| B: | −9.3531E−01 | −3.6320E−01 | 1.8722E−01 | 5.6596E−01 | −2.4059E−01 |
| C: | 1.4911E+00 | 6.1042E+00 | 4.0242E+00 | −1.2911E+00 | 1.5911E+00 |
| D: | −1.6239E+00 | −2.1073E+01 | −1.5074E+01 | 3.9048E+00 | −4.8907E+00 |
| E: | 9.6296E−01 | 2.8659E+01 | 2.0373E+01 | −7.0746E+00 | 8.1596E+00 |
| F: | −7.2646E−01 | −1.4563E+01 | −9.3949E+00 | 5.8512E+00 | −5.3296E+00 |

| surface | 8 | 9 | 10 | 11 | 12 |
|---|---|---|---|---|---|
| K: | −8.7006E+01 | 1.5175E+01 | −7.6482E+00 | −1.8761E+02 | −5.7726E+00 |
| A: | −2.0522E−01 | 1.0931E−01 | −5.6610E−02 | −1.2258E−01 | −1.4497E−01 |
| B: | −2.0239E−01 | −1.5455E−01 | 2.3393E−01 | −1.9810E−02 | 7.4706E−02 |
| C: | 7.6323E−01 | 3.8190E−03 | −3.5107E−01 | 5.6925E−02 | −2.9260E−02 |
| D: | −1.4413E+00 | 2.7054E−02 | 2.3983E−01 | −2.3190E−02 | 7.2150E−03 |
| E: | 1.7155E+00 | 6.6590E−03 | −7.9270E−02 | 3.8630E−03 | −9.5000E−04 |
| F: | −7.6326E−01 | −4.1300E−03 | 1.0090E−02 | −2.4000E−04 | 5.1100E−05 |

| Embodiment 2 | | | |
|---|---|---|---|
| f[mm] | 3.38 | f23/f45 | −0.01 |
| Fno | 2.20 | f12/f34 | 1.41 |
| FOV[deg.] | 83.00 | f34/f5 | −1.27 |
| f1/f2 | −0.45 | f1/f234 | 0.69 |
| f2/f4 | −2.14 | f234/f5 | −1.69 |
| f4/f5 | −1.20 | f123/f4 | 1.62 |
| f1/f3 | −0.08 | f123/f45 | 0.01 |
| f2/f5 | 2.57 | V1 − V2 | 34.50 |
| f1/f4 | 0.97 | V4 − V3 | 34.50 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

-continued

| Embodiment 2 | | | |
|---|---|---|---|
| f1/f23 | −0.54 | f/TL | 0.86 |
| f23/f4 | −1.80 | | |

Figure 3A:
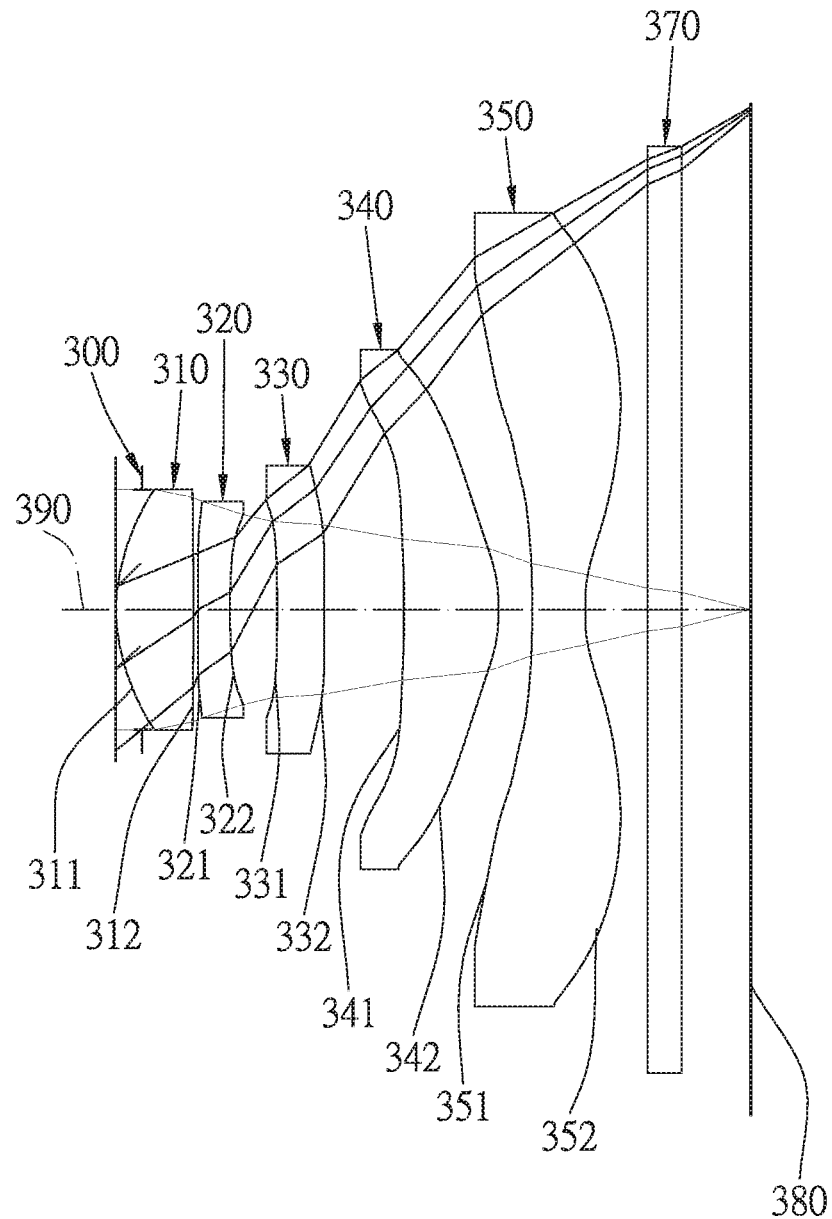
FIG. 3A shows a five-piece optical imaging lens in accordance with a third embodiment of the present invention.
Figure 3B:
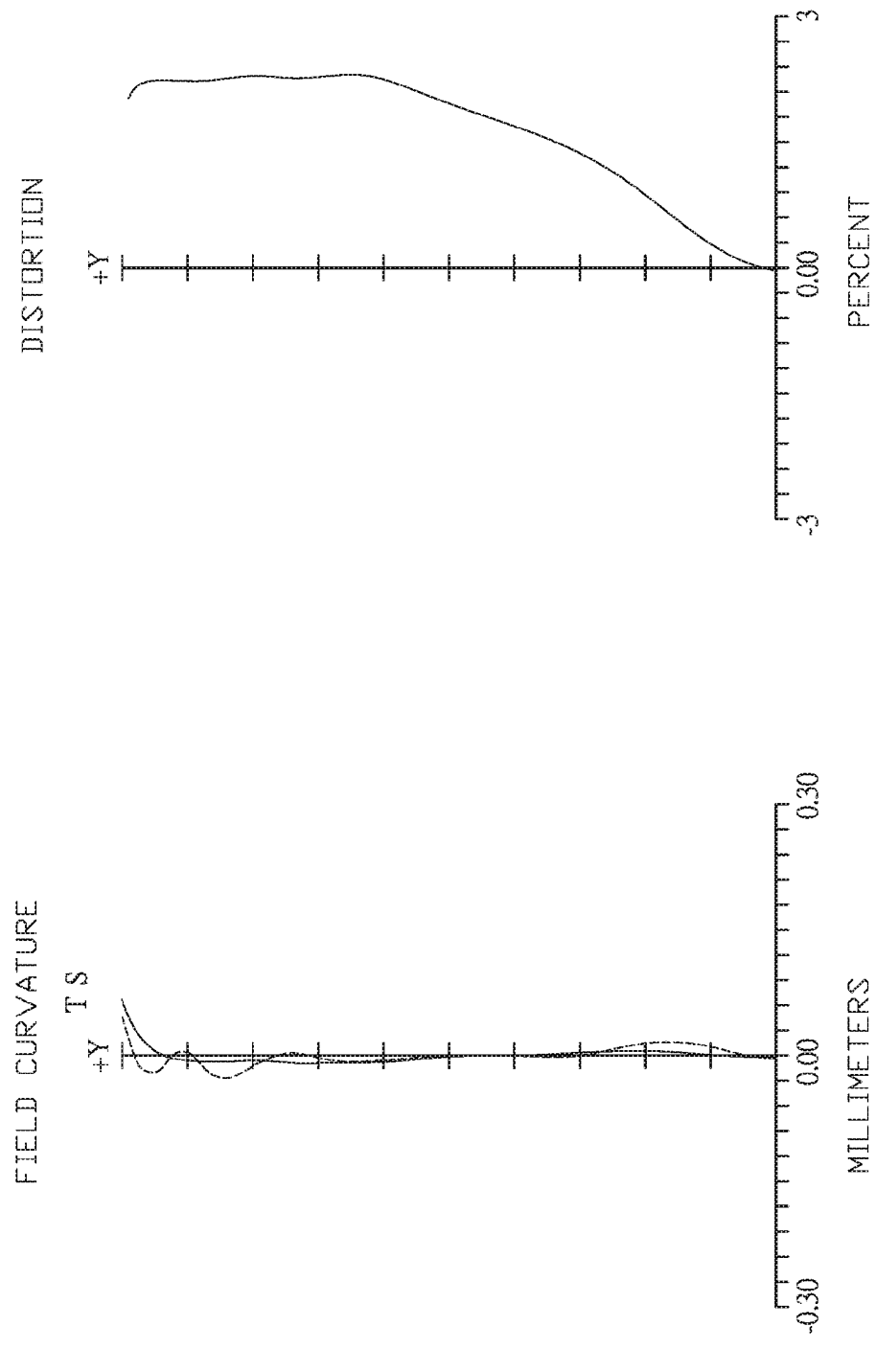
FIG. 3B shows the longitudinal spherical aberration curve, the astigmatic field curve and the distortion curve of the third embodiment of the present invention.

FIG. 3A shows a five-piece optical imaging lens in accordance with a third embodiment of the present invention, and FIG. 3B shows, in order from left to right, the longitudinal spherical aberration curves, the astigmatic field curves, and the distortion curve of the third embodiment of the present invention. The five-piece optical imaging lens in accordance with the third embodiment of the present invention comprises an aperture stop 300 and an optical assembly. The optical assembly comprises, in order from an object side to an image side: a first lens element 310, a second lens element 320, a third lens element 330, a fourth lens element 340, a fifth lens element 350, an IR cut filter 370 and an image plane 380, wherein the five-piece optical imaging lens has a total of five lens elements with refractive power. The aperture stop 300 is located between an image-side surface 312 of the first lens element 310 and an object to be photographed.

The first lens element 310 with a positive refractive power has an object-side surface 311 being convex near an optical axis 390 and the image-side surface 312 being concave near the optical axis 390, both the object-side and image-side surfaces 311, 312 are aspheric, and the first lens element 310 is made of plastic material.

The second lens element 320 with a negative refractive power has an object-side surface 321 being convex near the optical axis 390 and an image-side surface 322 being concave near the optical axis 390, both the object-side and image-side surfaces 321, 322 are aspheric, and the second lens element 320 is made of plastic material.

The third lens element 330 with a negative refractive power has an object-side surface 331 being concave near the optical axis 390 and an image-side surface 332 being concave near the optical axis 390, both the object-side and image-side surfaces 331, 332 are aspheric, the third lens element 330 is made of plastic material.

The fourth lens element 340 with a positive refractive power has an object-side surface 341 being concave near the optical axis 390 and an image-side surface 342 being convex near the optical axis 390, both the object-side and image-side surfaces 341, 342 are aspheric, the fourth lens element 340 is made of plastic material.

The fifth lens element 350 with a negative refractive power has an object-side surface 351 being concave near the optical axis 390 and an image-side surface 352 being concave near the optical axis 390, both the object-side and image-side surfaces 351, 352 are aspheric, the fifth lens element 350 is made of plastic material, and at least one inflection point is formed on one of the object-side surface 351 and the image-side surface 352 of the fifth lens element 350.

The IR cut filter 370 made of glass is located between the fifth lens element 350 and the image plane 380 and has no influence on the focal length of the optical imaging lens.

The detailed optical data of the third embodiment is shown in table 5, and the aspheric surface data is shown in table 6.

TABLE 5

Embodiment 3
f(focal length) = 3.35 mm, Fno = 2.2, FOV = 84 deg.

| Surface | | Curvature Radius | | Thickness | Material | index | Abbe # | Focal length |
|---|---|---|---|---|---|---|---|---|
| 0 | object | Infinity | | Infinity | | | | |
| 1 | | Infinity | | 0.160 | | | | |
| 2 | stop | Infinity | | −0.160 | | | | |
| 3 | lens 1 | 1.172 | (ASP) | 0.479 | plastic | 1.544 | 56.000 | 2.420 |
| 4 | | 8.872 | (ASP) | 0.030 | | | | |
| 5 | lens 2 | 38.922 | (ASP) | 0.195 | plastic | 1.650 | 21.400 | −5.321 |
| 6 | | 3.202 | (ASP) | 0.295 | | | | |
| 7 | lens 3 | −29.017 | (ASP) | 0.290 | plastic | 1.650 | 21.400 | −31.372 |
| 8 | | 71.504 | (ASP) | 0.491 | | | | |
| 9 | lens 4 | −9.666 | (ASP) | 0.586 | plastic | 1.544 | 56.000 | 1.883 |
| 10 | | −0.950 | (ASP) | 0.205 | | | | |
| 11 | lens 5 | −4.597 | (ASP) | 0.330 | plastic | 1.544 | 56.000 | −1.580 |
| 12 | | 1.090 | (ASP) | 0.380 | | | | |
| 13 | IR-filter | Infinity | | 0.210 | glass | 1.517 | 64.167 | — |
| 14 | | Infinity | | 0.425 | | | | |
| 15 | image plane | Infinity | | Infinity | | | | |

TABLE 6

Aspheric Coefficients

| surface | 3 | 4 | 5 | 6 | 7 |
|---|---|---|---|---|---|
| K: | −7.3032E+00 | 1.0830E+02 | −7.8511E+01 | 1.3248E+01 | 1.3955E+02 |
| A: | 5.4995E−01 | −2.3465E−01 | −1.0387E−01 | 1.4748E−02 | −3.1986E−01 |
| B: | −9.5530E−01 | −2.2344E−01 | 3.5714E−01 | 7.6289E−01 | 5.9614E−02 |
| C: | 1.7778E+00 | 6.7115E+00 | 4.9115E+00 | −1.9302E+00 | 4.2589E−01 |
| D: | −2.6835E+00 | −2.5331E+01 | −2.0513E+01 | 5.5979E+00 | −2.8265E+00 |
| E: | 2.5611E+00 | 3.6318E+01 | 3.0079E+01 | −1.0043E+01 | 6.6074E+00 |
| F: | −1.7283E+00 | −1.8996E+01 | −1.5186E+01 | 8.1314E+00 | −5.2382E+00 |

| surface | 8 | 9 | 10 | 11 | 12 |
|---|---|---|---|---|---|
| K: | −1.4153E+02 | −5.0325E+01 | −6.1060E+00 | −2.0000E+02 | −5.7726E+00 |
| A: | −2.3878E−01 | −2.8320E−02 | −1.2992E−01 | −7.2460E−02 | −1.4138E−01 |
| B: | 9.6490E−02 | 2.0047E−01 | 4.9726E−01 | −1.4520E−02 | 7.6866E−02 |
| C: | −4.8500E−02 | −4.1564E−01 | −6.4484E−01 | 3.8511E−02 | −2.8690E−02 |
| D: | −2.1877E−01 | 2.7288E−01 | 3.9390E−01 | −1.5690E−02 | 6.4720E−03 |
| E: | 6.8488E−01 | −7.2060E−02 | −1.1833E−01 | 2.5900E−03 | −7.9000E−04 |
| F: | −4.0041E−01 | 6.6870E−03 | 1.4047E−02 | −1.6000E−04 | 3.9100E−05 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 3.35 | f23/f45 | −0.05 |
| Fno | 2.20 | f12/f34 | 1.95 |
| FOV[deg.] | 84.00 | f34/f5 | −1.23 |
| f1/f2 | −0.45 | f1/f234 | 1.25 |
| f2/f4 | −2.83 | f234/f5 | −1.37 |
| f4/f5 | −1.19 | f123/f4 | 2.19 |
| f1/f3 | −0.08 | f123/f45 | 0.04 |
| f2/f5 | 3.37 | V1 − V2 | 34.50 |
| f1/f4 | 1.28 | V4 − V3 | 34.50 |
| f1/f23 | −0.54 | f/TL | 0.86 |
| f23/f4 | −2.39 | | |

In the present five-piece optical imaging lens, the lens elements can be made of plastic or glass. If the lens elements are made of plastic, the cost will be effectively reduced. If the lens elements are made of glass, there is more freedom in distributing the refractive power of the five-piece optical imaging lens. Plastic lens elements can have aspheric surfaces, which allow more design parameter freedom (than spherical surfaces), so as to reduce the aberration and the number of the lens elements, as well as the total track length of the five-piece optical imaging lens.

In the present five-piece optical imaging lens, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The five-piece optical imaging lens of the present invention can be used in focusing optical systems and can obtain better image quality. The five-piece optical imaging lens of the present invention can also be used in electronic imaging systems, such as, 3D image capturing, digital camera, mobile device, digital flat panel or vehicle camera.

The embodiments depicted above and the appended drawings are exemplary and are not intended to be exhaustive or to limit the scope of the present disclosure to the precise forms disclosed. Many modifications and variations are possible in view of the above teachings.

What is claimed is:
1. A five-piece optical imaging lens, in order from an object side to an image side, comprising:
an aperture stop;
a first lens element with a positive refractive power having an object-side surface being convex near an optical axis and the image-side surface being concave near the optical axis, at least one of the object-side and image-side surfaces of the first lens element being aspheric;
a second lens element with a negative refractive power having an object-side surface being convex near the optical axis and an image-side surface being concave near the optical axis, at least one of the object-side and image-side surfaces of the second lens element being aspheric;
a third lens element with a negative refractive power having an image-side surface being concave near the optical axis, at least one of an object-side and the image-side surfaces of the third lens element being aspheric;
a fourth lens element with a positive refractive power having an object-side surface being concave near the optical axis and an image-side surface being convex near the optical axis, at least one of the object-side and image-side surfaces of the fourth lens element being aspheric; and
a fifth lens element with a negative refractive power having an image-side surface being concave near the optical axis, at least one of an object-side and the image-side surfaces of the fifth lens element being aspheric, and at least one inflection point being formed on the object-side surface and the image-side surface of the fifth lens element;
wherein a focal length of the first lens element is f1, the focal length of the fourth lens element is f4, and they satisfy the relation: $0.7 < f1/f4 < 1.6$.

2. The five-piece optical imaging lens as claimed in claim 1, wherein the focal length of the fourth lens element is f4, a focal length of the second and third lens elements combined is f23, and they satisfy the relation: $-2.7 < f23/f4 < -1.5$.

3. The five-piece optical imaging lens as claimed in claim 1, wherein the focal length of the first lens element is f1, a focal length of the second lens element is f2, and they satisfy the relation: $-0.7 < f1/f2 < -0.3$.

4. The five-piece optical imaging lens as claimed in claim 1, wherein the focal length of the fourth lens element is f4, a focal length of the second lens element is f2, and they satisfy the relation: $-3.1 < f2/f4 < -1.8$.

5. The five-piece optical imaging lens as claimed in claim 1, wherein the focal length of the fourth lens element is f4, a focal length of the fifth lens element is f5, and they satisfy the relation: $-1.5 < f4/f5 < -0.9$.

6. The five-piece optical imaging lens as claimed in claim 1, wherein the focal length of the first lens element is f1, a focal length of the third lens element is f3, and they satisfy the relation: $-0.15 < f1/f3 < -0.05$.

7. The five-piece optical imaging lens as claimed in claim 1, wherein a focal length of the second lens element is f2, the focal length of the fifth lens element is f5, and they satisfy the relation: $2.3 < f2/f5 < 3.7$.

8. The five-piece optical imaging lens as claimed in claim 1, wherein the focal length of the first lens element is f1, a focal length of the second and third lens elements combined is f23, and they satisfy the relation: $-0.75 < f1/f23 < -0.35$.

9. The five-piece optical imaging lens as claimed in claim 1, wherein a focal length of the second and third lens elements combined is f23, a focal length of the fourth and fifth lens elements combined is f45, and they satisfy the relation: $-0.1 < f23/f45 < -0.005$.

10. The five-piece optical imaging lens as claimed in claim 1, wherein a focal length of the first and second lens elements combined is f12, a focal length of the third and fourth lens elements combined is f34, and they satisfy the relation: $1.0 < f12/f34 < 2.4$.

11. The five-piece optical imaging lens as claimed in claim 1, wherein a focal length of the third and fourth lens elements combined is f34, a focal length of the fifth lens element is f5, and they satisfy the relation: $-1.6 < f34/f5 < -0.9$.

12. The five-piece optical imaging lens as claimed in claim 1, wherein the focal length of the first lens element is f1, a focal length of the second, third and fourth lens elements combined is f234, and they satisfy the relation: $0.5<f1/f234<1.5$.

13. The five-piece optical imaging lens as claimed in claim 1, wherein a focal length of the fifth lens element is f5, a focal length of the second, third and fourth lens elements combined is f234, and they satisfy the relation: $-2.0<f234/f5<-1.1$.

14. The five-piece optical imaging lens as claimed in claim 1, wherein the focal length of the fourth lens element is f4, a focal length of the first, second, and third lens elements combined is f123, and they satisfy the relation: $1.3<f123/f4<2.6$.

15. The five-piece optical imaging lens as claimed in claim 1, wherein a focal length of the first, second, and third lens elements combined is f123, a focal length of the fourth and fifth lens elements combined is f45, and they satisfy the relation: $0.005<f123/f45<0.1$.

16. The five-piece optical imaging lens as claimed in claim 1, wherein an Abbe number of the first lens element is V1, an Abbe number of the second lens element is V2, and they satisfy the relation: $30<V1-V2<42$.

17. The five-piece optical imaging lens as claimed in claim 1, wherein an Abbe number of the third lens element is V3, an Abbe number of the fourth lens element is V4, and they satisfy the relation: $30<V4-V3<42$.

18. The five-piece optical imaging lens as claimed in claim 1, wherein a focal length of the five-piece optical imaging lens is f, a distance from the object-side surface of the first lens element to the image plane along the optical axis is TL, and they satisfy the relation: $0.6<f/TL<0.95$.

* * * * *